(12) United States Patent
Nomura et al.

(10) Patent No.: US 10,771,973 B2
(45) Date of Patent: Sep. 8, 2020

(54) TRANSMISSION AND RECEPTION APPARATUS AND NON-TRANSITORY COMPUTER READABLE MEDIUM STORING PROGRAM

(71) Applicant: FUJI XEROX CO., LTD., Tokyo (JP)

(72) Inventors: Kenta Nomura, Kanagawa (JP);
Asahito Shioyasu, Kanagawa (JP);
Tomoki Tanihata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/372,421

(22) Filed: Apr. 2, 2019

(65) Prior Publication Data

US 2020/0107398 A1 Apr. 2, 2020

(30) Foreign Application Priority Data

Oct. 1, 2018 (JP) .................................. 2018-186631

(51) Int. Cl.
*H04W 12/06* (2009.01)
*H04W 88/06* (2009.01)

(52) U.S. Cl.
CPC ............ *H04W 12/06* (2013.01); *H04W 88/06* (2013.01)

(58) Field of Classification Search
None
See application file for complete search history.

(56) References Cited

U.S. PATENT DOCUMENTS

2008/0022293 A1* 1/2008 Motoyama ......... H04N 1/00127
719/331
2016/0233987 A1* 8/2016 Arashin ................ H04L 1/1816

FOREIGN PATENT DOCUMENTS

JP 6152242 6/2017

\* cited by examiner

*Primary Examiner* — Brian Whipple
(74) *Attorney, Agent, or Firm* — JCIPRNET

(57) ABSTRACT

A transmission and reception apparatus includes a first communication unit that performs communication by a first communication method, a second communication unit that performs communication by a second communication method which is higher in directivity than the first communication method and is faster than the first communication method, and a control unit that performs control such that storage confirmation information, which indicates whether data has been stored in a storage device provided in a first target machine without an error, is received through the first communication unit after the data is transmitted to the first target machine through the second communication unit, data transmission confirmation is received from the first target machine, and the data is transmitted to a second target machine through the second communication unit.

7 Claims, 6 Drawing Sheets

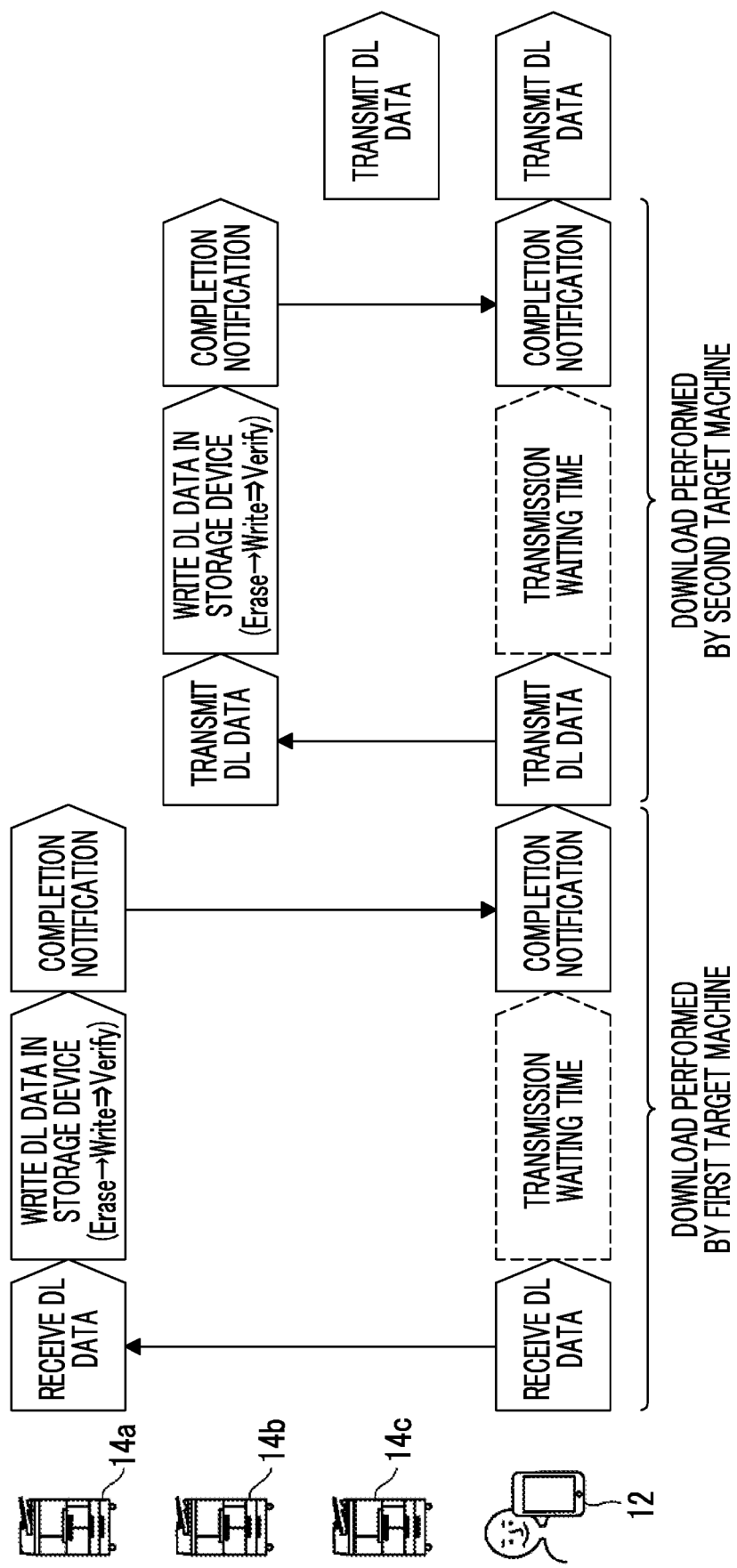

TRANSMISSION AND RECEPTION APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-186631 filed Oct. 1, 2018.

BACKGROUND

(i) Technical Field

The present invention relates to a transmission and reception apparatus and a non-transitory computer readable medium storing a program.

(ii) Related Art

JP6152242B discloses a method by which a portable electronic machine, in which a first wireless module that performs short-range wireless communication and a second wireless module that consumes smaller power than the first wireless module are installed, and a function enhancement device for the portable electronic machine, in which a third wireless module that can communicate with the first wireless module and a fourth wireless module that can communicate with the second wireless module are installed, communicate with each other, the method including: defining a first region, in which a user holding the portable electronic machine is able to physically manage the propriety of data transmission to a nearby machine connected to the function enhancement device, and a second region, which is on the outside of the first region and which includes a region in which the first wireless module and the third wireless module are able to communicate with each other, as the vicinity of the function enhancement device; stopping the first wireless module in a separation state where the portable electronic machine is present in the second region; detecting an approach state where the portable electronic machine is present in the first region based on the state of communication between the second wireless module and the fourth wireless module; causing the portable electronic machine to operate the first wireless module according to detection of the approach state; and causing the first wireless module and the third wireless module to establish connection.

SUMMARY

Aspects of non-limiting embodiments of the present disclosure relate to a transmission and reception apparatus and a non-transitory computer readable medium storing a program with which, in a case where data is transmitted from a terminal apparatus to a plurality of target machines in a wireless manner, a transmission wait time can be shortened in comparison with a case where data is transmitted by one communication method.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a transmission and reception apparatus including a first communication unit that performs communication by a first communication method, a second communication unit that performs communication by a second communication method which is higher in directivity than the first communication method and is faster than the first communication method, and a control unit that performs control such that storage confirmation information, which indicates whether data has been stored in a storage device provided in a first target machine without an error, is received through the first communication unit after the data is transmitted to the first target machine through the second communication unit, data transmission confirmation is received from the first target machine, and the data is transmitted to a second target machine through the second communication unit.

BRIEF DESCRIPTION OF THE DRAWINGS

Exemplary embodiment(s) of the present invention will be described in detail based on the following figures, wherein:

FIG. 6 is a timing chart illustrating a temporal operation flow of a terminal apparatus and target machines in a comparative example.

DETAILED DESCRIPTION

Next, an exemplary embodiment of the present invention will be described in detail with reference to drawings.

Figure 1:
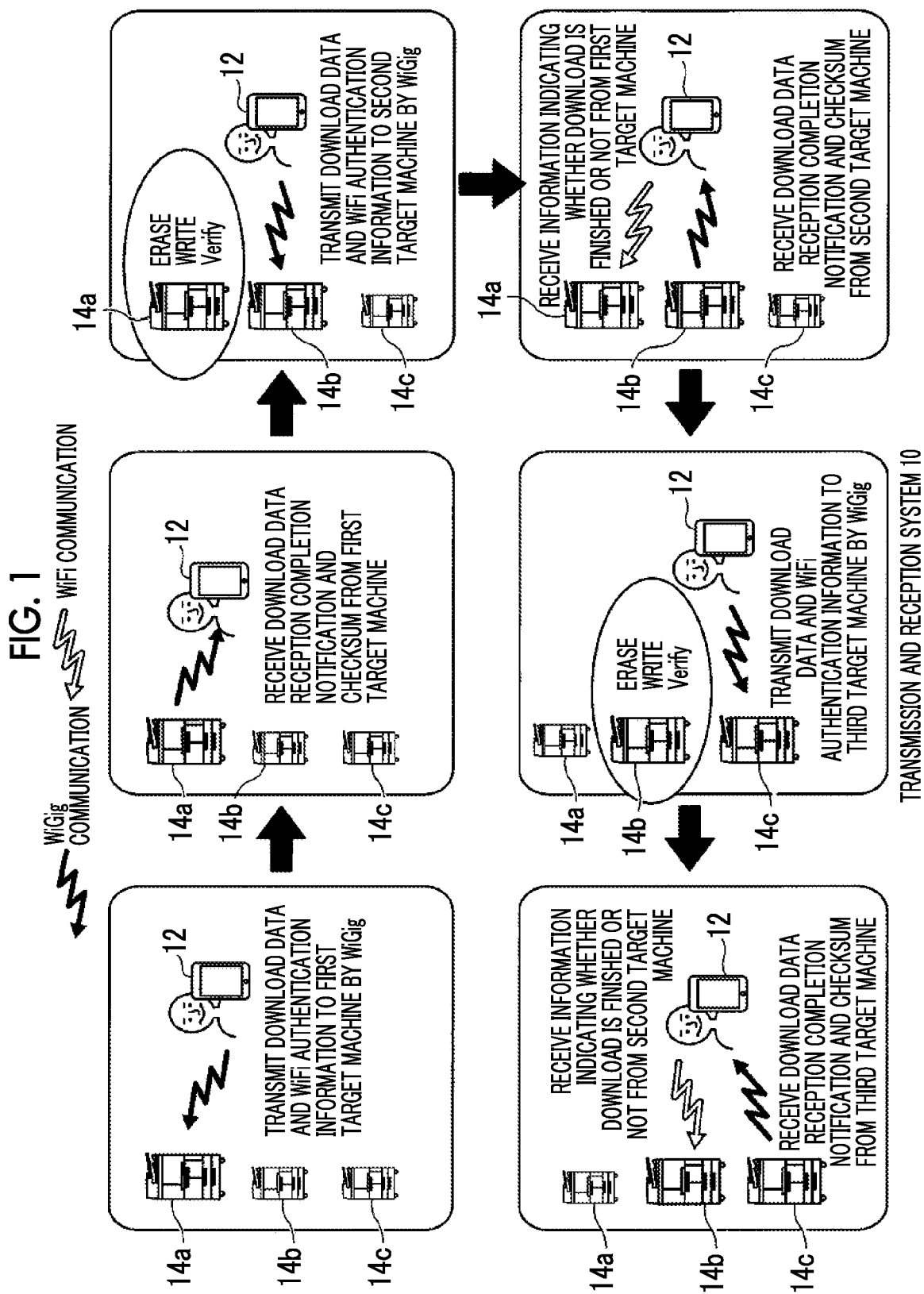
FIG. 1 is a schematic view illustrating the entire transmission and reception system according to an exemplary embodiment of the present invention.

FIG. 1 is a configuration view including an operation flow of a transmission and reception system 10 according to the exemplary embodiment of the present invention.

A transmission and reception system 10 is a system in which data is transmitted and received between a terminal apparatus 12 and, for example, three target machines 14*a* to 14*c* that can communicate with the terminal apparatus 12 in a wireless manner. The terminal apparatus 12 is, for example, a smart phone, a personal computer, or the like. The target machines 14*a* to 14*c* are, for example, image forming apparatuses and more specifically, the target machines 14*a* to 14*c* are so-called multifunction machines having a printing function, a facsimile function, a copying function, a scanning function, and the like.

In the exemplary embodiment, data is downloaded to the target machines 14*a* to 14*c* from the terminal apparatus 12. Although the kind of data is not particularly limited, an example in which firmware is downloaded to the target machines 14*a* to 14*c* will be described in the exemplary embodiment.

Here, firmware is a program for controlling the operation of the target machines 14*a* to 14*c* and there is a case where the firmware is downloaded to provide an update for the purpose of improvement of the functions of the target machines 14a to 14c, troubleshooting, or the like. The firmware to be downloaded will be referred to as download data.

First, the terminal apparatus 12 transmits the download data and authentication information for a first communication method (authentication information for WiFi) to the first target machine 14a by a second communication method. The first communication method is, for example, WiFi (registered trademark). WiFi is one of wireless communication methods established based on the IEEE 802.11 standard. In addition, the second communication method is higher in directivity than the first communication method and is faster than the first communication method. For example, WiGig (Wireless Gigabit (registered trademark)) is used as the second communication method. WiGig is one of wireless communication methods standardized as IEEE 802.11ad.

Next, the terminal apparatus 12 receives download data reception completion notification and a checksum from the first target machine 14a. The checksum is transmission confirmation data obtained by dividing data to be transmitted into blocks, encoding the blocks, and adding up the values thereof. Adding up is performed in the same manner on a reception side as well and when the value obtained through the adding up is equal to a received value, it is determined that data has been correctly transmitted.

Next, the terminal apparatus 12 transmits the download data and the authentication information for the first communication method to the second target machine 14b by WiGig, which is the second communication method. In the first target machine 14a, data erasing, data erasing, and data verification of a storage device of the first target machine 14a are performed after the checksum is transmitted to the terminal apparatus 12. The data verification will be described in detail later.

Next, the terminal apparatus 12 receives download data reception completion notification and a checksum from the second target machine 14b. In addition, the terminal apparatus 12 receives storage confirmation information, which indicates whether download is complete or not, from the first target machine 14a before or after receiving the download data reception completion notification and the checksum from the second target machine 14b. Transmission and reception of the storage confirmation information are performed by Wi-Fi, which is the first communication method.

Next, the terminal apparatus 12 transmits the download data and the authentication information for the first communication method to the third target machine 14c by WiGig, which is the second communication method. In the second target machine 14b, data erasing, data writing, and data verification of a storage device of the second target machine 14b are performed after the checksum is transmitted to the terminal apparatus 12.

Next, the terminal apparatus 12 receives download data reception completion notification and a checksum from the third target machine 14c. In addition, the terminal apparatus 12 receives storage confirmation information, which indicates whether download is complete or not, from the second target machine 14b before or after receiving the download data reception completion notification and the checksum from the third target machine 14c. Transmission and reception of the storage confirmation information are performed by Wi-Fi, which is the first communication method.

In the exemplary embodiment, in a case where the firmware is downloaded to the target machines 14a to 14c, download to the second target machine 14b is started without waiting for, for example, the storage confirmation information from the first target machine 14a.

Figure 2:
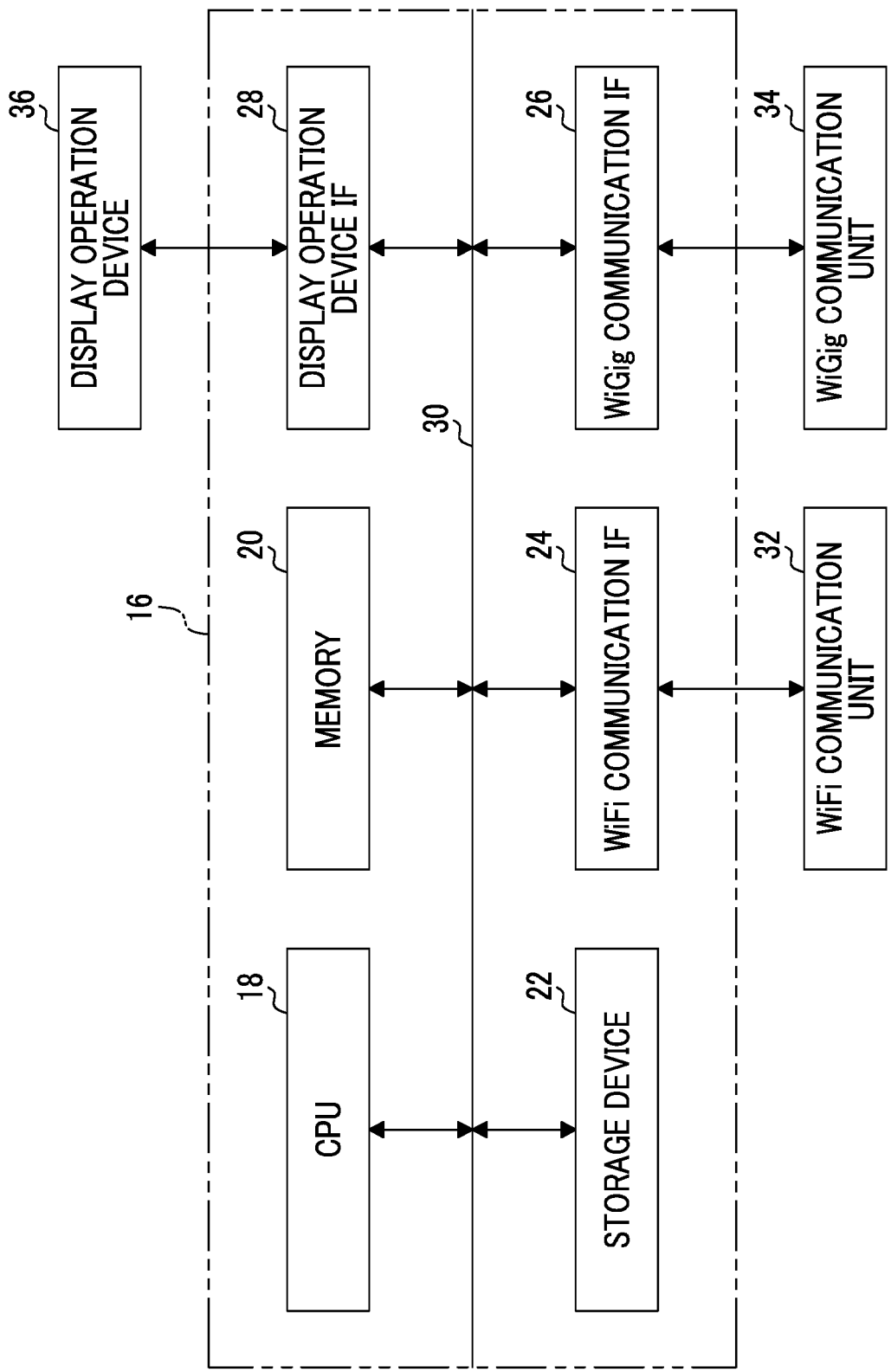
FIG. 2 is a block diagram illustrating a hardware configuration of a terminal apparatus used in the exemplary embodiment of the present invention.

FIG. 2 illustrates a hardware configuration of the terminal apparatus 12.

The terminal apparatus 12 includes a control main body unit 16. The control main body unit 16 includes a CPU 18, a memory 20, a storage device 22, a WiFi communication interface 24, a WiGig communication interface 26, and a display operation device interface 28 and the CPU 18, the memory 20, the storage device 22, the WiFi communication interface 24, the WiGig communication interface 26, and the display operation device interface 28 are connected to each other via a bus 30.

The CPU 18 executes a predetermined process based on a control program stored in the memory 20. The memory 20 is a volatile memory such as a random access memory (RAM). The storage device 22 is configured of a non-volatile memory such as a flash memory, a hard disk, or the like and necessary software or data is stored therein. Here, the download data to be installed in the target machines 14a to 14c is stored in the storage device 22. A WiFi communication unit 32 is connected to the WiFi communication interface 24 such that WiFi communication can be performed. A WiGig communication unit 34 is connected to the WiGig communication interface 26 such that WiGig communication can be performed. A display operation device 36 is connected to the display operation device interface 28. The display operation device 36 is configured by combining, for example, a touch panel and a liquid crystal display.

Figure 3:
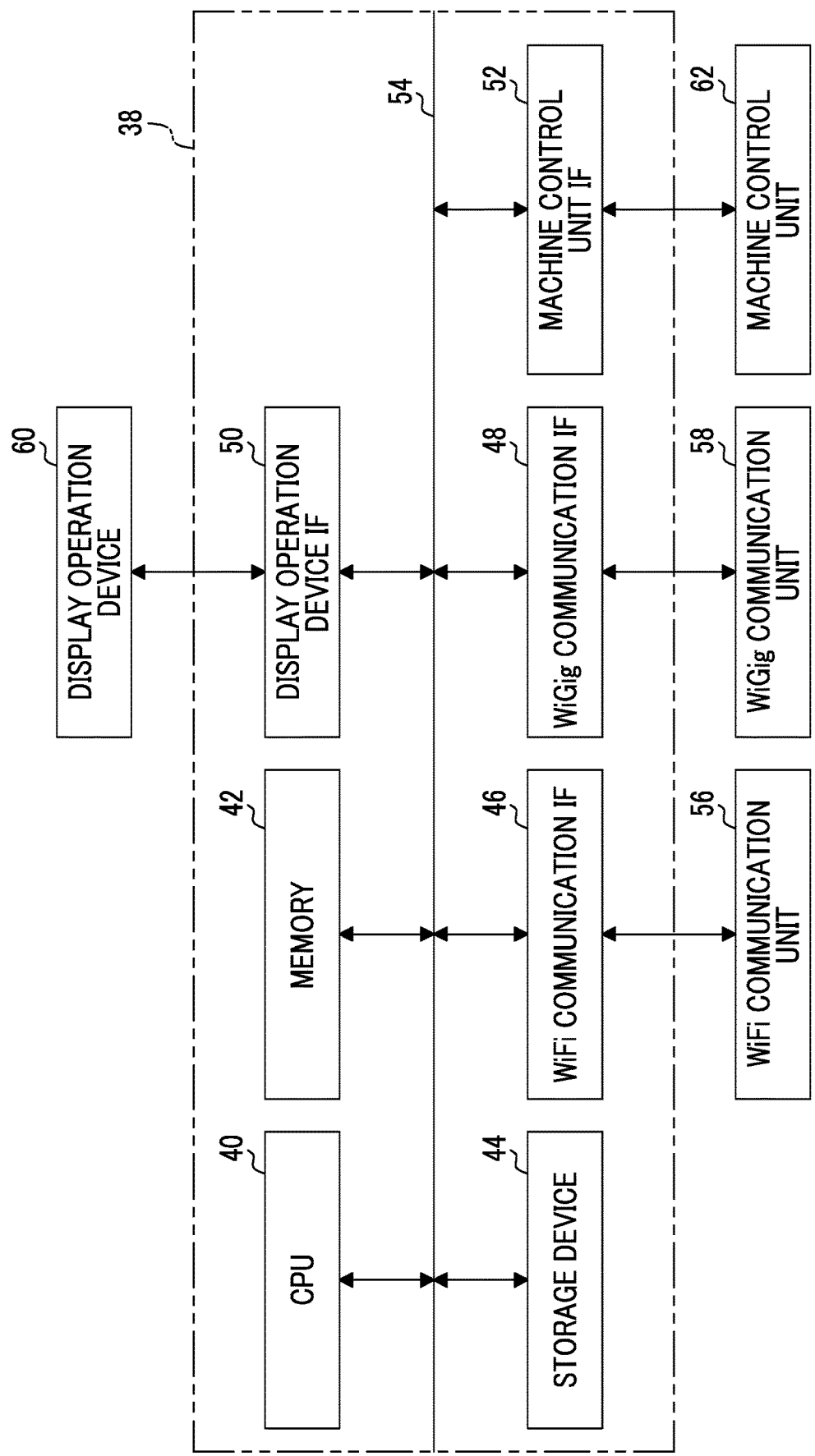
FIG. 3 is a block diagram illustrating a hardware configuration of a target machine used in the exemplary embodiment of the present invention.

FIG. 3 illustrates a hardware configuration of each of the target machines 14a to 14c.

Each of the target machines 14a to 14c includes a control main body unit 38. The control main body unit 38 includes a CPU 40, a memory 42, a storage device 44, a WiFi communication interface 46, a WiGig communication interface 48, a display operation device interface 50, and a machine control unit interface 52 and the CPU 40, the memory 42, the storage device 44, the WiFi communication interface 46, the WiGig communication interface 48, the display operation device interface 50, and the machine control unit interface 52 are connected to each other via a bus 54.

The CPU 40 executes a predetermined process based on a control program stored in the memory 42. The memory 42 is a volatile memory such as a RAM. Data is temporarily stored in the memory 42. The storage device 44 is configured of a non-volatile memory such as a flash memory, a hard disk, or the like and necessary software or data is stored therein. A WiFi communication unit 56 is connected to the WiFi communication interface 46 such that WiFi communication can be performed. A WiGig communication unit 58 is connected to the WiGig communication interface 48 such that WiGig communication can be performed. A display operation device 60 is connected to the display operation device interface 50. The display operation device 60 is configured by combining, for example, a touch panel and a liquid crystal display. A machine control unit 62 is connected to the machine control unit interface 52. The machine control unit 62 controls machines of the target machines 14a to 14c, for example, each machine of an image forming unit.

Figure 4:
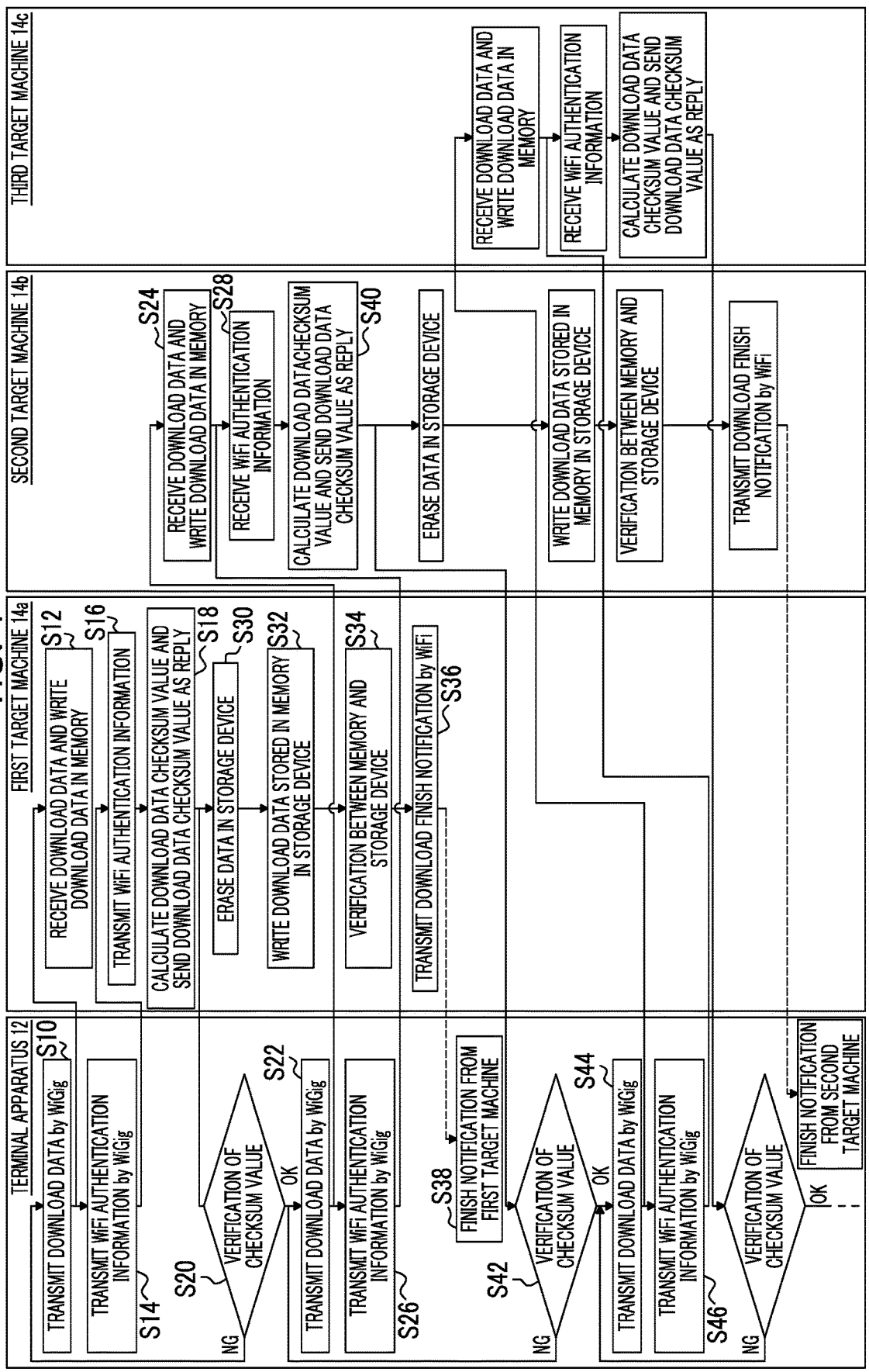
FIG. 4 is a sequence diagram illustrating an operation flow of the terminal apparatus and target machines in the exemplary embodiment of the present invention.

FIG. 4 is a sequence diagram illustrating an operation flow of the terminal apparatus 12 and the target machines 14a to 14c.

First, in Step S10, the terminal apparatus 12 transmits the download data to the first target machine 14a. The download data is transmitted by WiGig. In Step S12, the first target machine 14a receives the download data and writes the download data in the memory 42. In addition, in Step S14, the terminal apparatus 12 transmits WiFi authentication information to the first target machine 14a. The WiFi authentication information is transmitted by WiGig. In Step S16, the first target machine 14a receives the WiFi authentication information transmitted from the terminal apparatus 12. Accordingly, WiFi communication between the terminal apparatus 12 and the first target machine 14a is enabled.

Next, in Step S18, the first target machine 14a calculates a checksum value and sends the calculated checksum value to the terminal apparatus 12 as a reply. In Step S20, the terminal apparatus 12 determines whether the checksum value sent as a reply is equal to a checksum value calculated at the time of transmission or not. In a case where it is determined that the checksum value is not correct in Step S20, the process returns to Step S10 and the download data is transmitted to the first target machine 14a again. Meanwhile, In a case where it is determined that the checksum value is correct in Step S20, the process proceeds to Step S22 and the terminal apparatus 12 transmits the download data to the second target machine 14b by WiGig. In Step S24, the second target machine 14b receives the download data and writes the download data in the memory 42. In addition, in Step S26, the terminal apparatus 12 transmits WiFi authentication information to the second target machine 14b. The WiFi authentication information is transmitted by WiGig. In Step S28, the second target machine 14b receives the WiFi authentication information transmitted from the terminal apparatus 12. Accordingly, WiFi communication between the terminal apparatus 12 and the second target machine 14b is enabled.

After the first target machine 14a calculates the checksum value of the download data and sends the calculated checksum value to the terminal apparatus 12 as a reply in Step S18, the first target machine 14a proceeds to Step S30. In Step S30, data stored in the storage device 44 is erased. Next, in Step S32, the first target machine 14a writes the download data stored in the memory 42 in the storage device 44. Note that, an erasing process in Step S30 is needed in a case where the storage device 44 is a flash memory. However, in a case where the storage device 44 is a hard disk, the erasing process in Step S30 is not needed although a writing process in Step S32 is performed.

Next, in Step S34, the first target machine 14a performs a verifying process. The verifying process is a process of confirming whether data is stored in the storage device 44 without an error or not. Here, the download data stored in the storage device 44 is read and is compared with the download data stored in the memory 42.

Next, in Step S36, the first target machine 14a transmits verifying process result information (storage confirmation information indicating whether download data has been stored in storage device 44 without error) to the terminal apparatus 12 as download finish notification. In Step S38, the terminal apparatus 12 receives the storage confirmation information and a process with respect to the first target machine 14a is terminated regardless of whether the download data has been stored in the storage device 44 without an error. The download finish notification is performed by WiFi.

As described above, WiGig is higher in directivity than WiFi. Accordingly, in a case where the download data is transmitted to the second target machine 14b by WiGig in Step S22, the terminal apparatus 12 is separated from the first target machine 14a because the download needs to be performed with the terminal apparatus 12 being close to the second target machine 14b. Therefore, there is a possibility that the download finish notification cannot be transmitted to the terminal apparatus 12 from the first target machine 14a byWiGig and thus the download finish notification is transmitted to the terminal apparatus 12 by WiFi.

When a process in Step S26 is terminated, the second target machine 14b proceeds to Step S40, calculates a checksum value, and transmits the calculated checksum value to the terminal apparatus 12. In Step S42, the terminal apparatus 12 determines whether the checksum value is correct or not. In a case where the checksum value is not correct, the process returns to Step S22 and in a case where the checksum value is correct, the download data and the WiFi authentication information are transmitted to the third target machine 14c by WiGig in Steps S44 and S46. Thereafter, the process as described above is repeated.

Note that, in a case where the terminal apparatus 12 receives the storage confirmation information indicating that the download data has not been downloaded to the storage device 44 in Step S38, download to the first target machine 14a may be performed again immediately or may be performed again after download to all of the target machines is finished.

Figure 5:
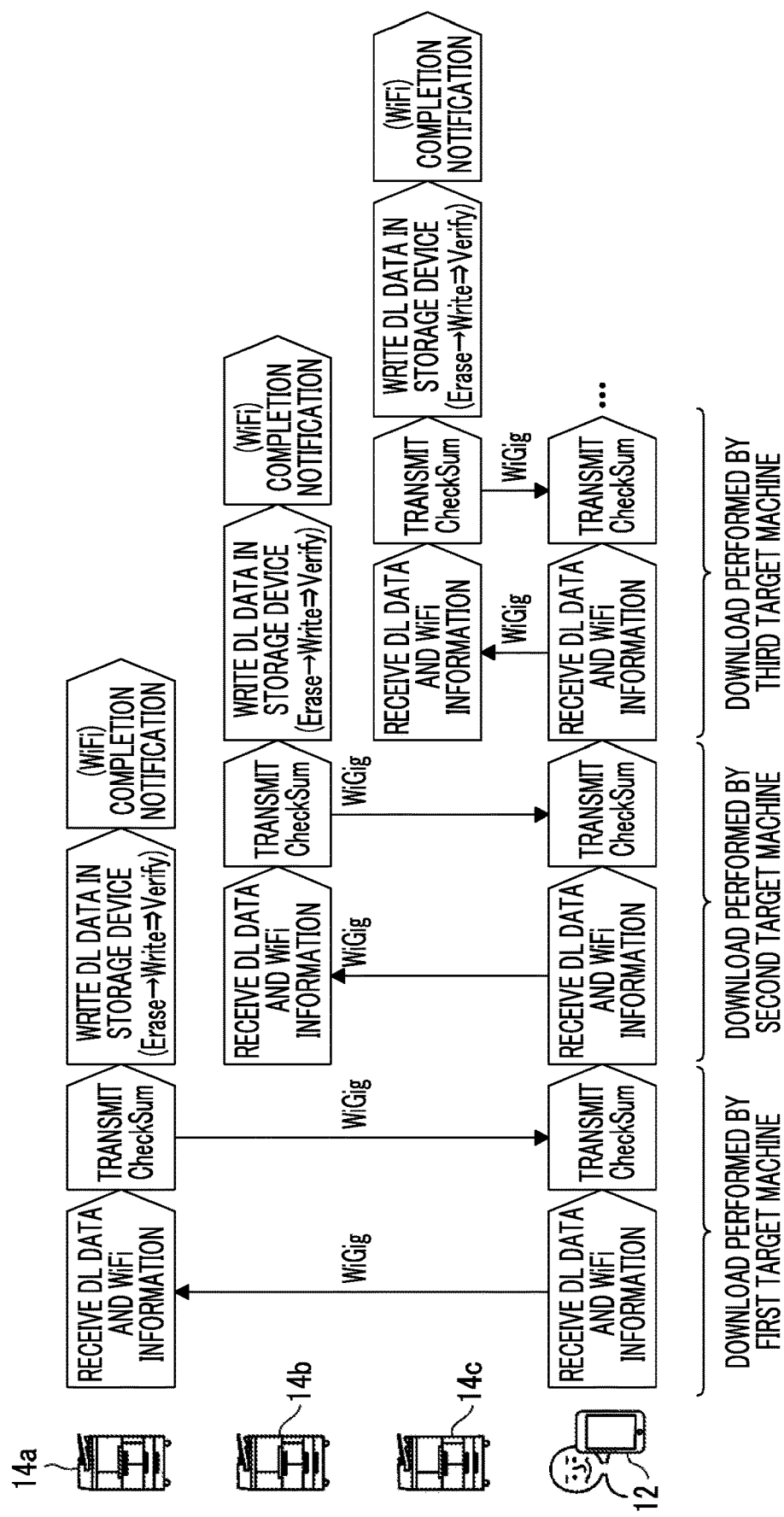
FIG. 5 is a timing chart illustrating a temporal operation flow of the terminal apparatus and target machines in the exemplary embodiment of the present invention.

FIG. 5 illustrates a temporal operation flow of the terminal apparatus 12 and the target machines 14a to 14c according to the exemplary embodiment of the present invention.

The terminal apparatus 12 transmits the download data and the WiFi authentication information to the second target machine 14b immediately after receiving the checksum value from the first target machine 14a. At this time, in the first target machine 14a, writing the download data (erasing data in storage device, writing download data on storage device, and verifying process) is performed.

Meanwhile, FIG. 6 illustrates a temporal operation flow of the terminal apparatus 12 and the target machines 14a to 14c according to a comparative example.

In the comparative example, the terminal apparatus 12 transmits the download data to the second target machine 14b after receiving completion notification from the first target machine 14a. Accordingly, there is a transmission waiting time of the terminal apparatus 12, which corresponds to a time taken for the first target machine 14a to write the download data (erasing data in storage device, writing download data on storage device, and verifying process), during a time period between when the download data is transmitted to the first target machine 14a and when the download data is transmitted to the second target machine 14b.

Accordingly, in the case of the exemplary embodiment of the present invention, a transmission waiting time, which corresponds to a time taken for the download data to be written, is short in comparison with the comparative example.

Note that, in the exemplary embodiment, the target machines are image forming apparatuses. However, the present invention is not limited thereto and a robot or an electronic product may be the target machine, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transmission and reception apparatus comprising:
a first communication unit that performs communication by a first communication method;
a second communication unit that performs communication by a second communication method which is higher in directivity than the first communication method and is faster than the first communication method; and
a control unit that performs control such that storage confirmation information, which indicates whether data has been stored in a storage device provided in a first target machine without an error, is received through the first communication unit after the data is transmitted to the first target machine through the second communication unit, data transmission confirmation is received from the first target machine, and the data is transmitted to a second target machine through the second communication unit.

2. The transmission and reception apparatus according to claim 1,
wherein the control unit performs control such that the data is transmitted to the first target machine along with authentication information for the first communication method.

3. The transmission and reception apparatus according to claim 2,
wherein the control unit performs control such that the data is transmitted to the second target machine along with authentication information for the first communication method.

4. The transmission and reception apparatus according to claim 1,
wherein the control unit performs control such that the data is transmitted to the second target machine along with authentication information for the first communication method.

5. A transmission and reception apparatus comprising:
a first communication unit that performs communication by a first communication method;
a second communication unit that performs communication by a second communication method which is higher than directivity than the first communication method and is faster than the first communication method;
a storage unit that stores transmitted data; and
a control unit that performs control such that storage confirmation information, which indicates whether data has been stored in the storage unit without an error, is transmitted to a terminal apparatus through the first communication unit after data from the terminal apparatus is received through the second communication unit and data reception confirmation is transmitted to the terminal apparatus.

6. The transmission and reception apparatus according to claim 5,
wherein the control unit performs control such that authentication information for the first communication method is received along with the data transmitted from the terminal apparatus.

7. A non-transitory computer readable medium storing a program causing a computer to execute a process, the process comprising:
transmitting data to a first target machine by a second communication method which is higher in directivity than a first communication method and is faster than the first communication method;
receiving data transmission confirmation from the first target machine;
transmitting the data to a second target machine by the second communication method; and
receiving storage confirmation information, which indicates whether the data has been stored in a storage device provided in the first target machine without an error, from the first target machine by the first communication method.

* * * * *